(12) United States Patent
Archambault et al.

(10) Patent No.: US 8,490,065 B2
(45) Date of Patent: Jul. 16, 2013

(54) METHOD AND APPARATUS FOR SOFTWARE-ASSISTED DATA CACHE AND PREFETCH CONTROL

(75) Inventors: Roch Archambault, North York (CA); Yaoqing Gao, North York (CA); Francis Patrick O'Connell, Austin, TX (US); Robert Brett Tremaine, Stormville, NY (US); Michael Edward Wazlowski, New Fairfield, CT (US); Steven Wayne White, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1759 days.

(21) Appl. No.: 11/250,054

(22) Filed: Oct. 13, 2005

(65) Prior Publication Data
US 2007/0088915 A1     Apr. 19, 2007

(51) Int. Cl.
*G06F 9/44* (2006.01)
*G06F 9/45* (2006.01)

(52) U.S. Cl.
USPC .................. 717/130; 717/140; 717/151

(58) Field of Classification Search
None
See application file for complete search history.

(56) References Cited

U.S. PATENT DOCUMENTS

| | | | | |
|---|---|---|---|---|
| 6,397,379 B1 * | 5/2002 | Yates et al. | | 717/140 |
| 6,574,712 B1 * | 6/2003 | Kahle et al. | | 711/137 |
| 6,675,374 B2 * | 1/2004 | Pieper et al. | | 717/141 |
| 7,107,583 B2 * | 9/2006 | Hobbs et al. | | 717/150 |
| 7,571,432 B2 * | 8/2009 | Heishi et al. | | 717/151 |
| 7,587,709 B2 * | 9/2009 | Chilimbi et al. | | 717/130 |
| 8,095,920 B2 * | 1/2012 | Liao et al. | | 717/140 |
| 2002/0199178 A1 * | 12/2002 | Hobbs et al. | | 717/150 |
| 2004/0103401 A1 * | 5/2004 | Chilimbi et al. | | 717/130 |
| 2004/0215896 A1 | 10/2004 | McCalpin et al. | | |
| 2005/0086653 A1 * | 4/2005 | Heishi et al. | | 717/151 |

OTHER PUBLICATIONS

Wang et al. Guided Region Prefetching:A Cooperative Hardware/Software Approach, ISCA'03, Jun. 2003, pp. 388-398, Retrieved on [Jan. 28, 2010], Retrieved from the Internet:URL<http://ieeexplore.ieee.org/stamp/stamp.jsp?arnumber=01207016.*

Jain et al. Software-assisted Cache Replacement Mechanism for Embedded Systems, Proceedings of the 2001 IEEE/ACM international conference on Computer aided design, 2001, pp. 119-126, Retrieved on [Jan. 28, 2010].*

Dorai et el. Transparent threads: resource sharing in SMT processors for high single-thread performance. Parallel Architectures and Compilation Techniques, 2002. Proceedings, pp. 30-41, Retrieved on [Feb. 7, 2013], Retrieved from the Internet: URL<http://ieeexplore.ieee.org/xpls/abs_all.jsp?arnumber=1105971>.*

(Continued)

*Primary Examiner* — Thuy Dao
*Assistant Examiner* — Cheneca Smith
(74) *Attorney, Agent, or Firm* — Yee & Associates, P.C.; Libby Z. Toub

(57) ABSTRACT

The present invention provides a computer implemented method, apparatus, and computer usable program code for compiling instructions to manage a cache system. Loop constructs are analyzed to identify data usage characteristics for cache and prefetching conditions in instructions to form identified prefetch conditions. A set of control instructions are inserted into the instructions based on the data usage characteristics and the identified prefetch conditions to form multiple modified instructions. The set of multiple modified instructions are compiled to generate code for execution to form compiled instructions. The set of control instructions in the compiled instructions form a cache management policy to control movement of data in a memory system during execution of the compiled instructions.

20 Claims, 8 Drawing Sheets

OTHER PUBLICATIONS

Yew et al. Compiler and Hardware Support for Cache Coherence in Large-Scale Multiprocessors: Design Considerations and Performance Study. ISCA 1996, pp. 283-294, Retrieved on [Mar. 5, 2013] Retrieved from the Internet: URL<http://ieeexplore.ieee.org/stamp/stamp.jsp?tp=&arnumber=1563055&userType=inst>.*

Smith, "Sequential Program Prefetching in Memory Hierarchies", IEEE Transactions on Computers, vol. 11, No. 12 Dec. 1978, pp. 7-21.

Chen et al., "Effective Hardware-Based Data Prefetching for High-Performance Processors", IEEE Transactions on Computers, vol. 44, No. 5, May 1995, 15 pages.

Collins et al., "Speculative Precomputation: Long-range Prefetching of Delinquent Loads", Proceedings of the 28th International Symposium on Computer Architecture Jul. 2001, 12 pages.

Nesbit et al., "Data Cache Prefetching Using a Global History Buffer", IEEE Micro, Jan.-Feb. 2005, pp. 90-97.

Solihin et al., "Using a User-Level Memory Threat for Correlation Prefetching", Proc. 29th Annual International Symposium on Computer Architecture, IEEE Press, 2002, pp. 171-182.

Tendler et al., "POWER4 system microarchitecture", IBM Journal of Research & Development, vol. 46, No. 1, Jan. 2002, pp. 5-26.

Maki et al., "Data-Replace-Controlled Cache Memory System and its Performance Evaluations", 1999, IEEE Tencon, pp. 471-4474.

Kessler, "The Alpha 21264 Microprocessor", Mar.-Apr. 1999, IEEE Micro, pp. 24-36.

Sikha et al., "The PowerPC Architecture: A Specification for a New Family of RISC Processors", 1994, Morgan Kaufmann Publishers Inc. ISBN 1558603166.

* cited by examiner

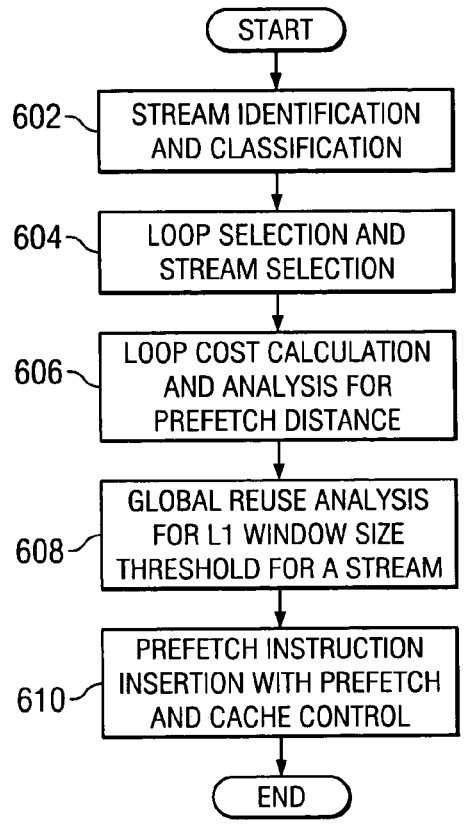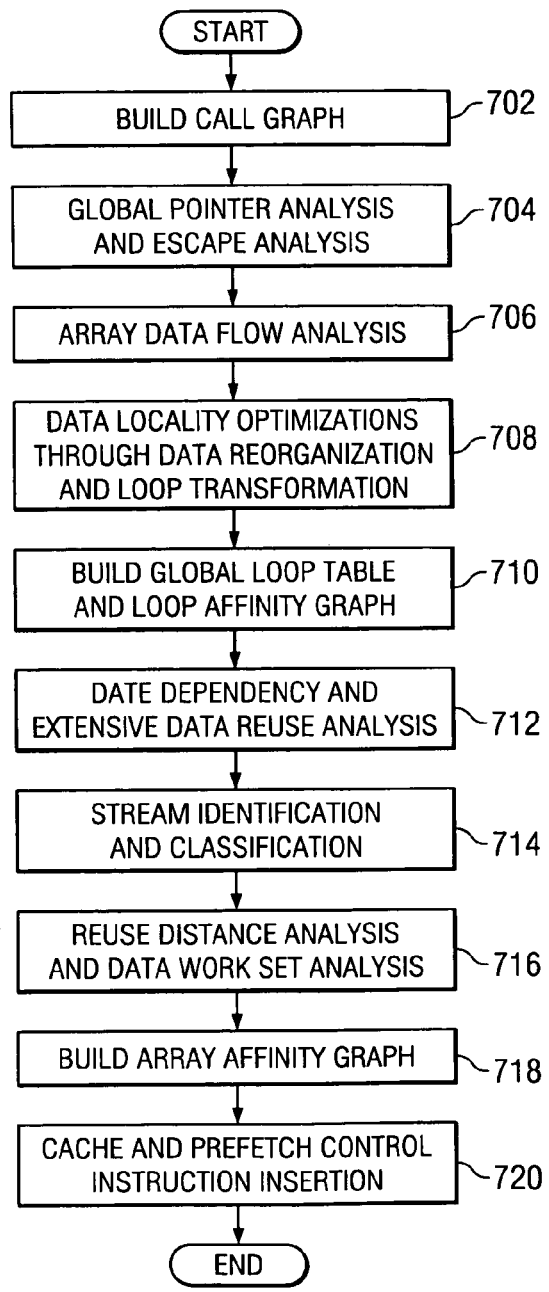

*FIG. 8*   800

802 — void_DCBFLL1(const void* addr);
   flush L1 cache line only, containing the address addr;

804 — void_protected_unlimited_stream_set_go(unsigned int StreamDirection, const void* StreamAddr, unsigned int StreamID, unsigned int StreamStride, unsigned char ControlFlag);
   Establish an unlimited length protected stream using identifier StreamID which begins with the cache line at StreamAddr
   StreamDirection: FORWARD or BACKWARD;
   SteamID: 0,...15;
   StreamStride: the stream stride;
   ControlFlag: NONE, KEEP, or KILL 806 {
   void_protected_stream_set(unsigned int StreamDirection, const void* StreamAddr, unsigned int StreamID);
      Establish a limited length protected stream using identifier StreamID which begins with the cache line at StreamAddr
   void_protected_stream_count(unsigned int unit_StreamLength, unsigned int StreamID, unsigned int StreamStride, unsigned char ControlFlag);
      Set the number of cache lines StreamLength for the limited length protected stream with identifier StreamID.
   void_protected_stream_control(unsigned int StreamID, unsigned int StreamStride, unsigned char ControlFlag, unsigned int threshold);
      set L1 window size control for the given stream
}

808 {
   void_protected_stream_go();
      Start to prefetch all limited length protected streams;
   void_protected_stream_stop(unsigned int StreamID);
      Stop prefetching the protected steam with identifier ID;
   void_protected_stream_stop_all();
      Stop prefetching all the protected steams;
}

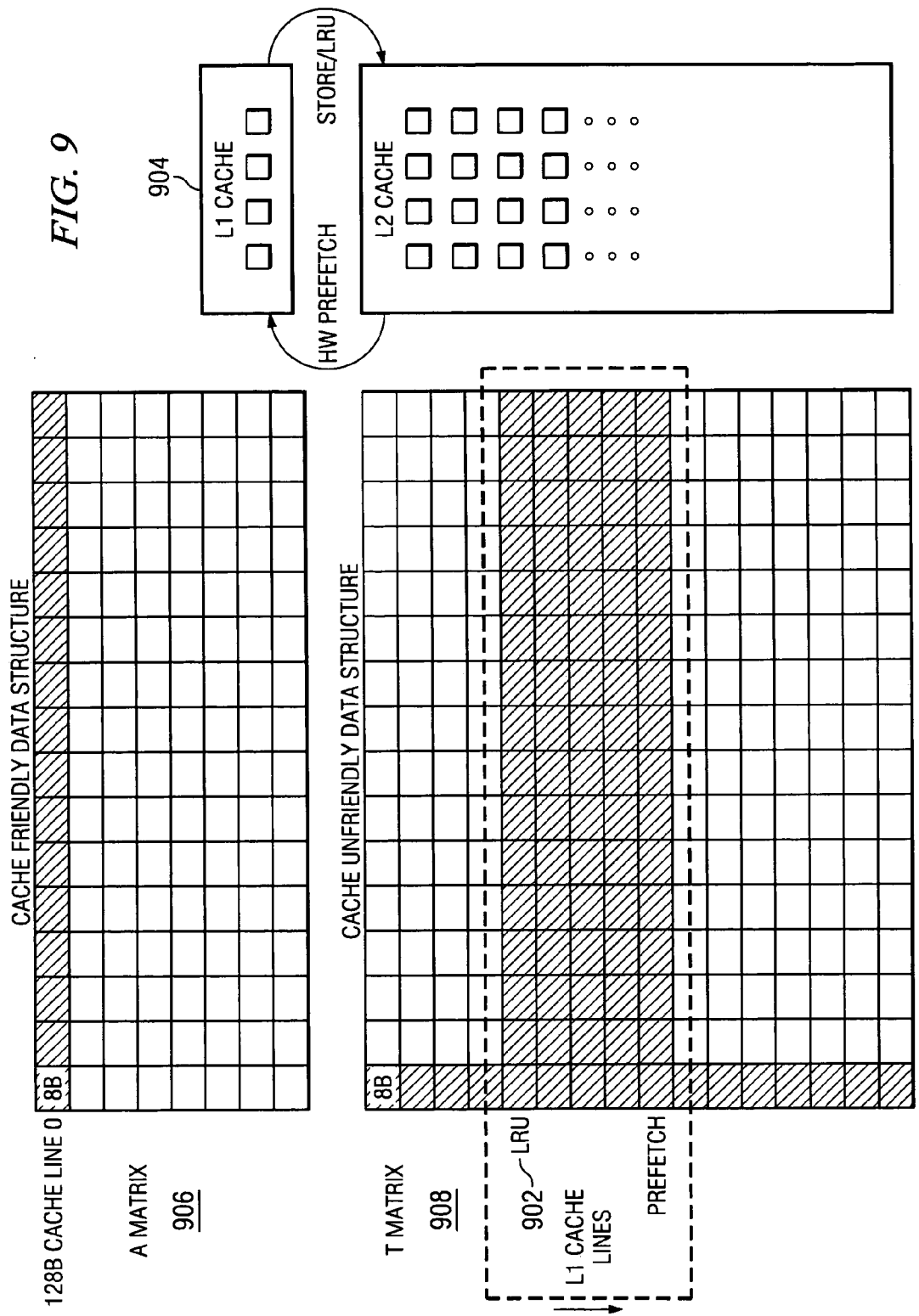

FIG. 10

```
        1002                              1004
for (i=0; i<10000, i++)       NMP_move(&c[0],
{                              &b[0],10000*sizeof(double));
  c[i]=b[i];
}                         ⇒
...some code...               ...some code...
for (i=0; i<10000, i++)       for (i=0; i<10000, i++) {
{                                a[i]=d[i] * a[i];
```

```
for (i=0; i<10000, i++)       for (i=0; i<625, i++) {
{                                a[i]=b[i]+c[i];
  a[i]=b[i]+c[i];                a[i+1]=b[i+1]+c[i+1];
}                                ...
...some code...                  a[i+15]=b[i+15]+
for (i=0; i<10000, i++)   ⇒      c[i+15];
{                                __DCBFLL1(b[i]);
                                 __DCBFLL1(c[i]);
                              }
                              ...some code...
         1100                 for (i=0; i<10000, i++) {
```

FIG. 12

```
some code to access array c...

sum=0.0;
for (i=0; i<N; i++) {
  sum+=a[i]*b[i];
}
some code with use of sum and array c, but
no immediate use of array a and b....
```

```
for (i=0; i<N, i++) {              for (iout=0; iout<MAX(M,N); iout+=iblock) {
  a[i]=b[i]+c[i];                    for (i=iout; i<MIN((iout+iblock-1), N), i++) {
}                                      a[i]=b[i]+c[i];
...some code...                      }
for (i=0; i<M, i++) {                ...some code...
  a[i]=d[i] * a[i];       ⇨         for (i=iout; i<MIN((iout+iblock-1), M), i++) {
}                                      a[i]=d[i] * a[i];
         1300                        }
                                   }
```

FIG. 14

```
double a[1000, 1000], b[1000, 1000],    for (iout=0; i<1000; i+=iblock) {
c [1000], d[1000];                        for (j=0; j<1000, j++) {
 .                                          temp = d[j];
 .                                          for (i=iout; i<(iout+iblock-1); i++) {
 .                                            a[j, i]=b[i, j]+c[i]+temp;
for (j=0; j<1000; j++) {                    }
  for (i=0; i<1000; i++) {                }
    a[j, i]=b[i, j]+c[i]+d[j];          }
  }
}
```

REUSE DISTANCE

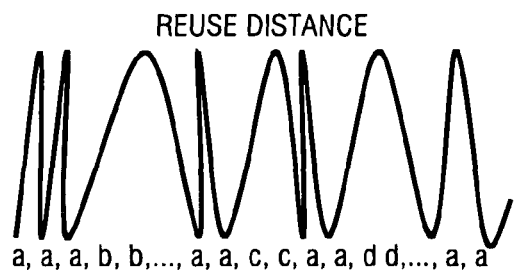

```
/* T=A'+T */
i_2=*nrow-2;
for (ki=0; ki<=i_2; ++ki) {
  ja=0;
  it=0;
  i_1=*ncol-2;
  for (kj=0; kj<=i_1; ++kj) {
    i_4=*nb;
    for (jj=1; jj<=i_4; ++jj) {
      i_3=*mb;
      for (k=1; k<=i_3; ++k) {
        t[it+jj+(jt+k)*t_dim1]+=a[ia+k+(ja+jj)*a_dim1];
      }
    }
    ja+=commtrb_1.jaz;
    it+=commtrb_1.itz;
  }
  some other code......
}
```
/*1600*/

FIG. 16B

```
/* T=A'+T */
i_2=*nrow-2;
for (ki=0; ki<=i_2; ++ki) {
  ja=0;
  it=0;
  i_1=*ncol-2;
  for (kj=0; kj<=i_1; ++kj) {
    i_4=*nb;
    for (jj=1; jj<=i_4; ++jj) {
      i_3=*mb;

_protected_stream_set(FORWARD, (&t[it+jj+(jt+1) * t_dim1], 0);
      _protected_stream_count(i_3, 0, t_dim1*sizeof(double), KILL);
      _protected_stream_go();

for (k=1; k<=i_3; ++k) {
        t[it+jj+(jt+k)*t_dim1]+=a[ia+k+(ja+jj)*a_dim1];
      }
    }
    ja+=commtrb_1.jaz;
    it+=commtrb_1.itz;
  }
  some other code......
}
```
/*1602*/

METHOD AND APPARATUS FOR SOFTWARE-ASSISTED DATA CACHE AND PREFETCH CONTROL

BACKGROUND OF THE INVENTION

1. Field of the Invention

The present invention is directed to an improved data processing system and in particular, to a computer implemented method and apparatus for data caching. Still more particularly, the present invention is directed to a computer implemented method, apparatus, and computer usable program code for software-assisted data cache and prefetch control.

2. Description of the Related Art

A cache is a collection of data duplicating original values stored elsewhere or computed earlier, where the original data require more extensive fetch and read times. Caching is a technique of temporarily storing frequently accessed data in random access memory (RAM), the cache. In modern computer systems, multiple layers of cache may be used, each of which has a smaller storage size than the main memory.

Caching allows the use of a faster but smaller memory type to accelerate a slower but larger memory type, or in a special area of a hard disk drive, to reduce the time required to read and write data. Once the data are stored in the cache, future use can be made by accessing the cached copy rather than re-fetching or re-computing the original data, so that the average access time is lower.

The hierarchical arrangement of memory helps bridge a widening gap between processor speeds and memory access rates. Despite large caches, memory access latencies still cause significant performance losses in many applications. The average data load latency for technical computing applications is large because caches are often ineffective for these programs. It is very common for computer program data structures to be too large to completely fit inside an L1 cache. It is also very common for a computer program to access more than one of these large data structures in a program causing competition for the resources of the L1 cache. While many programs can obtain acceptable performance by simply letting the processor manage its own caching, data prefetching may dramatically improve performance.

Hardware-based prefetch methods typically rely on the prediction of addresses to prefetch and thus are limited by prediction accuracy. These methods also may require memory to hold tables or histories of memory references. A hardware prefetch engine only can identify a limited number of streams to prefetch. Also, different behaviors are present with data access. Some data accesses show high spatial or temporal data locality and some data accesses have no reuse. An example of this type of data access is one that is performed in a stride fashion. Stride refers to the number of memory array elements which gets stepped through as an operation repeats. Spatial locality means that if a memory location is accessed, then most likely a location near this location will be accessed in the near future. Temporal locality means if a memory location is accessed, then most likely this memory location will be accessed again in the near future.

As an alternative, software-based prefetch methods are usually able to determine which address to prefetch but are hampered by the overhead from additional prefetch instructions inserted in an application.

SUMMARY OF THE INVENTION

The present invention provides a computer implemented method, apparatus, and computer usable program code for compiling instructions to manage a cache system. Loop constructs are analyzed to identify data usage characteristics for cache and prefetching conditions in instructions to form identified prefetch conditions. A set of control instructions are inserted into the instructions based on the data usage characteristics and the identified prefetch conditions to form multiple modified instructions. The set of multiple modified instructions are compiled to generate code for execution to form compiled instructions. The set of control instructions in the compiled instructions form a cache management policy to control movement of data in a memory system during execution of the compiled instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart illustrating steps taken to specify and assign an identifier to a stream in accordance with an illustrative embodiment of the present invention;

FIG. 7 is a flowchart illustrating the operation of a compiler in providing fine grain prefetch in accordance with an illustrative embodiment of the present invention;

FIG. 8 illustrates an example of code for implementing high level interfaces for cache and prefetch control instructions in accordance with exemplary aspects of the present invention;

FIG. 9 illustrates interaction of memory arrays as information is cycled in accordance with an illustrative embodiment of the present invention;

FIG. 10 illustrates exemplary code for no cross loop reuse in accordance with an illustrative embodiment of the present invention;

FIG. 11 illustrates exemplary code for cross-loop reuse for array "a" in accordance with an illustrative embodiment of the present invention;

FIG. 12 illustrates exemplary code for cross-loop reuse for array "c" in accordance with an illustrative embodiment of the present invention;

FIG. 13 illustrates exemplary code for loop strip mining for a large data set in accordance with an illustrative embodiment of the present invention;

FIG. 14 illustrates exemplary code for loop blocking in accordance with an illustrative embodiment of the present invention;

FIG. 15 is an illustrative graph of reuse distance in accordance with an illustrative embodiment of the present invention;

FIG. 16A illustrates exemplary code for stride accesses for array "t" in accordance with an illustrative embodiment of the present invention; and FIG. 16B illustrates exemplary code for stride accesses for array "t" with prefetch control instructions in accordance with an illustrative embodiment of the present invention.

DETAILED DESCRIPTION OF THE PREFERRED EMBODIMENT

Figure 1:
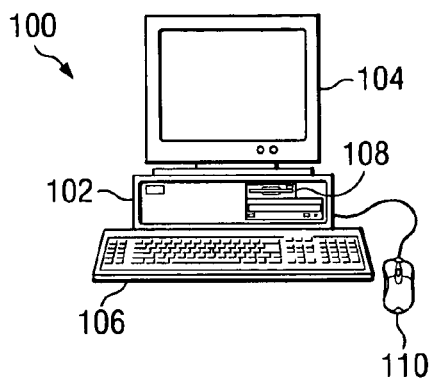
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
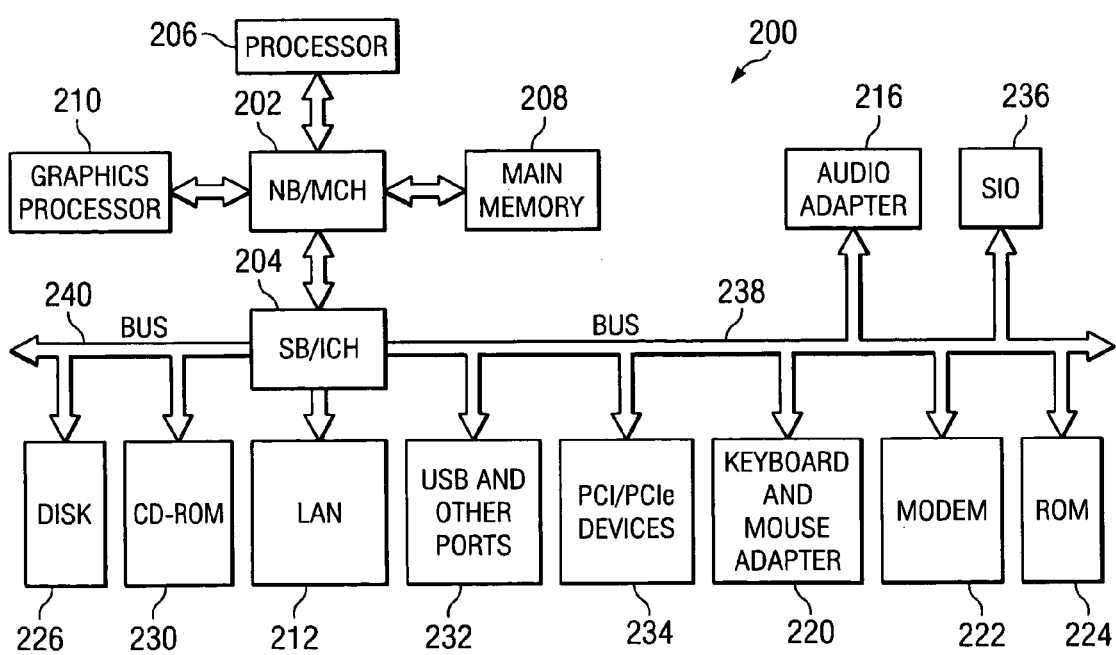
FIG. 2 is a block diagram of a data processing system in which the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system. The multiprocessor data processing system may include various levels of memory cache in a memory hierarchy.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments of the present invention provide a computer implemented method, system, and computer usable program code for software-assisted data cache and prefetch control. An illustrative embodiment of the present invention provides a computer implemented method for a compiler to do program analysis and provide fine-grain local control upper level of memory hierarchy with reuse consideration and cache pollution avoidance. Cache pollution as used herein is a delay that occurs when data that will not be used before the data is evicted and that data is loaded into cache, potentially displacing more useful data. Cache pollution often occurs when excessive amounts of data are cached or when data is cached too far in advance.

The present invention provides a method of analyzing loop constructs to identify data usage characteristics and identify prefetching conditions to create control instructions for a dynamic cache management policy and controlling movement of data in a memory system.

Figure 3:
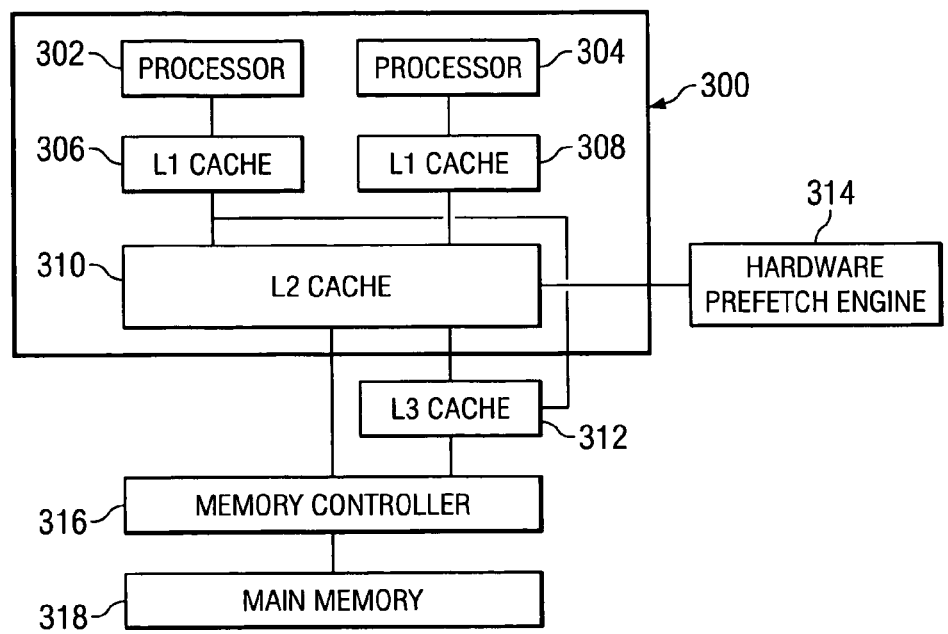
FIG. 3 is a block diagram of selected elements of a memory hierarchy in which aspects of the present invention may be implemented.

With reference now to FIG. 3, a block diagram of selected elements of a memory hierarchy in which aspects of the present invention may be implemented. Three exemplary levels of cache and a memory subsystem are illustrated in FIG. 3. The elements of FIG. 3 may be implemented in a hardware configuration such as data processing system 200 of FIG. 2. The different aspects of the present invention may be applied to other number of levels or architecture of storage devices other than those depicted in FIG. 3. This example is not meant to be an architectural limitation on the implementation of the different illustrative embodiments of the present invention.

Device 300 includes multiple elements. Alternatively, device 300 may be a single electronic element, such as a microchip or card. Processor 302 and processor 304 are each operably connected to L1 cache 306 and 308 respectively. L1 cache 306 and 308 interconnect with L2 cache 310 which is also on device 300. Off of device 300, L3 cache 312 is connected to the on-device cache systems.

Hardware prefetch engine 314 is operably connected to each of the three levels of cache. Hardware prefetch engine 314 functions to identify and automatically prefetch stride-one streams without any assistance from software. Stride as used herein refers to the distance between memory addresses of array elements that are touched in a loop. A stride-one loop touches successive array elements, and hence scans memory consecutively. A stride-one loop uses cache memory most efficiently because all of a cache line is used before the next cache line is fetched, and the loop never returns to a cache line after using it. Hardware prefetch engine 314 consists of upper-level processor side data pulling prefetch and lower-level memory side data pushing prefetch.

L2 cache 310 and L3 cache 312 are connected to memory controller 316 which in turn connects to main memory 318. In another embodiment, memory controller 316 may also be operably connected to a memory processor.

Hardware prefetch engine 314 can automatically set older prefetched cache lines to be the least recently used (LRU) in a set to achieve a virtual L1 cache prefetch buffer. Effective utilization of the cache hierarchy, particularly the very high speed small L1 cache 306, 308 nearest processor 302,304, is degraded when multiple computing contexts (stream, threads, and processes) share the resource. This degradation can be extreme when one or more computing streams compete for most or all of the L1 cache 306, 308.

Illustrative embodiments of the present invention provides the means to have only the data elements occupy space in the L1 cache 306, 308 that are immediately needed by processor 302, 304, otherwise the data resides in a lower cache, such as L2 cache 310. We establish "virtual prefetch buffers" in L1 cache 306, 308 where each "buffer" represents a minimal number of data elements to ensure processor 302, 304 references data from L1 cache 306, 308. Either hardware during the runtime, or the compiler before runtime, identifies the streams and data reference pattern and rate. This information is used to signal to hardware prefetch engine 314 when a particular data element will not be needed in the near future, so that data element can be either invalidated, or targeted for replacement, and/or have write-through to mitigate later write back.

A memory processor or special memory processor is a very basic processing element which can be used to initiate memory operations independent of the main processor that may be implemented in conjunction with an illustrative embodiment of the present invention. A memory processor runs small programs of instructions that can be used to fetch and store data from and to memory and to perform simple manipulations on the data. A memory processor is programmed and controlled by the main processing thread and as such, can be thought of as a special purpose co-processor or assist thread. The memory processor is useful in offloading work from the main processor. A memory processor can be implemented as a thread running on one of a set of processors in a homogenous computing environment or running on a special purpose processor in a heterogeneous environment. As herein defined, a set of processors is one or more processors that are operably interconnected.

The memory processor works in conjunction with an illustrative embodiment of the present invention to prefetch data into the L2 or L3 caches and is an alternative to using the hardware prefetch engine for that purpose. The intent is to generate memory accesses that populate the caches with data for addresses the main application will later use. Using a memory processor as a prefetch engine has important limitations, such as coarse software control and lack of better synchronization with the main application, which makes it unsuitable for prefetching into the L1 cache. Coarse software control means that the memory processor is more adeptly used for retrieving large sections of data rather than specific lines for the smaller L1 cache. The L1 is a small cache that can be easily damaged by prefetching too much data too soon and is better filled using fine grain control.

Figure 4:
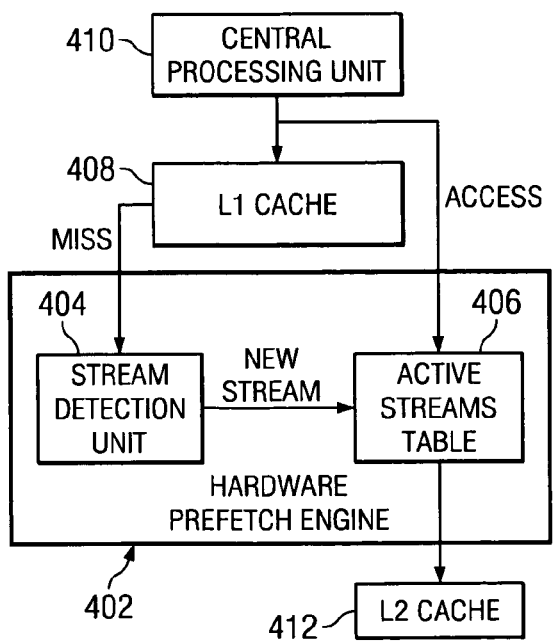
FIG. 4 is a block diagram of hardware prefetch engine and interconnected hardware in which aspects of the present invention may be implemented.

FIG. 4 is a block diagram of a hardware prefetch engine and interconnected hardware in accordance with an illustrative embodiment of the present invention. FIG. 4 is an illustrative example used to show interoperation of a few of many possible components that may be connected to hardware prefetch engine 402.

Hardware prefetch engine 402 may have two components, stream detection unit 404 and active streams table 406. Stream detection unit 404 monitors L1 cache 408 misses. When stream detection unit 404 monitors two consecutive misses of cache lines, stream detection unit 404 initiates a new stream in active streams table 406.

Active streams table 406 stores the next anticipated access for each active stream. Active streams table 406 watches memory accessed issued by central processing unit 410. If active streams table 406 sees the next anticipated access of an active stream, active streams table 406 will issue a prefetch request to both L1 cache 408 and L2 cache 412. Active streams table 406 then updates the next anticipated access.

In this illustrative embodiment, the hardware prefetch engine 402 consists of upper-level processor side data pulling prefetch and lower-level memory side data pushing prefetch.

The prefetch engine 402 supports stride streams in addition to sequential streams. It is very important to use large contiguous pages for the data structures which will be prefetched because the prefetch engine 402 will stop prefetching at a page boundary if the next page is not contiguous. Embodiments of the present invention enhance productivity by setting up and controlling stride streams with software instructions generated by the compiler. Sequential streams are detected by hardware alone and thus support high productivity.

Various prefetch instructions guide hardware prefetch engine 402 to set the usage state or least recently used (LRU) bit of lines of the L1 cache, indicating default value, kill, or keep with regard to the previous cache line. This categorization scheme prevents unnecessary cache damage by decreasing the footprint of prefetch streams.

To address L1 cache pollution from multiple streams, the prefetch engine automatically assigns a previously prefetched line which will no longer be used to the least recently used (LRU) in the cache set. Hardware prefetch engine monitors cache misses in order to execute prefetches. Monitoring allows the prefetch engine to know when the processor moves from one cache line to another and can set the least recently used status of old lines.

Hardware prefetch engine 402 of FIG. 4 may be implemented in an exemplary hardware configuration, such as hardware prefetch engine 314 in FIG. 3.

Figure 5:
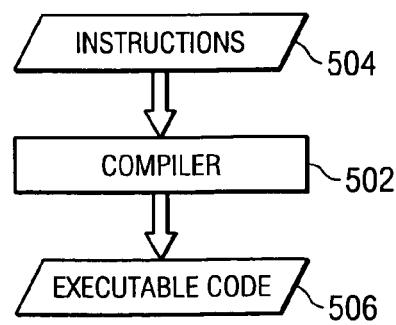
FIG. 5 is a block diagram of a compiler in which aspects of the present invention may be implemented.

FIG. 5 is a block diagram of a compiler in accordance with an illustrative embodiment of the present invention. Compiler 502 is generally defined as a computer program that translates a computer program written in one computer language into an equivalent set of instructions understandable and executable by the computer directly. Compiler 502 receives set of instructions 504 usually in the form of a source language. Compiler 502 translates set of instructions 504 into executable code 506. Set of instructions 504 are translated by compiler 502 and sent for execution on a system such as data processing system 200 of FIG. 2.

The compiler method is used to perform sophisticated program analysis. The compiler may also issue hints along with the memory operations, specifying whether to move data into a specific level of the cache with a small window or bypass the cache entirely for data that will only be read or written once in a long while or further push memory operations into a memory processor if any immediate reuse across loops are present.

An illustrative embodiment of the present invention provides a compiler method of characterizing data to determine what data in cache should be kept or replaced through global work data set analysis and reuse analysis. Additionally, the present invention provides cache and prefetch control instructions to manage data cache and prefetch. A set of control instructions may be inserted into the code being compiled to control the movement of data in the cache. The set of control instructions comprises one or more control instructions in these examples.

For example, a memory moving operation from array "a" to array "b" results in inefficient cache utilization if there are no immediate reuse to array "a" and array "b". This operation can be pushed into the memory processor to mitigate main processor cache damage. For the case where a loop accesses arrays "a" and "b", and there is no immediate cross loop reuse for arrays "a" and array "b", a L1-data cache only flush instruction can be used to flush each cache line of array "a" and array "b" so that arrays "a" and "b" will stay in L2, but not in L1 after they are processed. As a result, the other useful data remains in L1 and later accessing array "a" and array "b" is still relatively fast since they are L2 resident.

A set of simple cache and prefetch control instructions control data in different cache levels. The L1 cache closest to the main processors is used as a multi-stream prefetch buffer. A small window of L1 cache is used for each stream through cache and prefetch control instructions. These techniques are employed because the highest prefetch benefit is achieved when prefetching into the L1 cache. Control instructions may include specific cache-level line flush, invalidate, write-through, write-bypass, and usage state.

Prefetch control is provided to use L1 cache as a multiple stream prefetch buffer with a small window. A hardware reference threshold is established to automatically invalidate/flush the L1 cache line or a specific level of a cache after a predetermined number of references is provided for the hardware with the ability to automatically purge the L1 cache line without a special instruction of any type.

The threshold can be implemented in various ways. In one exemplary embodiment, a count value is initialized by the processor with a value "n" determined by the compiler. A cache line is automatically purged after "n" cache line references.

In another exemplary embodiment, a number of valid "prefetch buffered" lines is allowed. This threshold can be set by the compiler or selected from predetermined values. The hardware will automatically purge the cache line when the next prefetch is issued.

Prefetching strided streams is enabled by software. The compiler may either provide the stream and enable hardware stride stream prefetch through program analysis or tell the hardware to do automatic hardware stride detection and prefetching by issuing multiple hints "synchs" for the stride pattern and telling when to start and end the automatic hardware stride stream identification.

It is difficult for hardware, such as the hardware prefetch engine, to recognize large strides by observing the addresses of cache misses. Hardware recognition of streams is especially difficult in the midst of other streams. Compiler 502 can compute these strides and program the prefetch engine with the desired stride at run time. Compiler 502 can identify streams and their strides for many regular data accesses through global dependency analysis, reuse analysis, and stride analysis. Some irregular data accesses such as pointer-chasing code may exhibit regular stride patterns most time at run time. In such a case, dynamic stride value profiling can be used to identify the stride.

The prefetch distance required for stride streams can be much larger than that required by sequential streams. The required prefetch distance ultimately depends on the amount of computation performed within a cache line before moving to the next cache line. For example, the prefetch distance for an application that performs a computation on every element within a line can be much shorter than the distance for an application which consumes one element from a cache line and then moves to the next cache line. Significant performance can be lost if the same prefetch distances are used for sequential and stride streams.

An illustrative embodiment of the present invention allows L1 cache and L2 cache prefetch distance to be programmable for the stride prefetch engine. As stated above, this is necessary because the rate at which an application requests the next cache line is highly dependent on the application. Also, the number of streams being simultaneously fetched has a bearing on how far in advance to prefetch. Allowing the distances to be programmable will allow compiler 502 to pick appropriate values based on the application. Compiler 502 builds a machine performance model based on the underlying hardware architecture, calculates loop cost for each loop to gather the information about how fast a cache line is consumed and uses this information to set prefetch distance to guide hardware prefetch engine.

FIG. 6 is a flowchart illustrating steps taken to specify and assign an identifier to a stream in accordance with an illustrative embodiment of the present invention. The process illustrated in FIG. 6 may be implemented in a compiler, such as compiler 502 of FIG. 5. Exemplary instructions for implementing the steps described in FIG. 6 are more explicitly detailed in FIG. 8.

The process begins by identifying and classifying a stream through dependency analysis and access pattern analysis (step 602). A stream can be a stride-one stream with a constant stride less than L1 data cache line size, for example A[i]. A stream can be a stride stream with a constant stride larger than L1 data cache line size, for example A[300*i+20]. Also, a stream may be an indexed stream, for example A[B[i]+c]. A stream may also be an irregular stream. For the above examples, i is the innermost loop induction variable.

In the next step, loop selection and stream selection is performed (step 604). Hot loops are selected which are frequently executed. Additionally, the most profitable streams are selected and marked as protected until the number of protected streams reaches the total number of hardware supported streams based on static analysis and dynamic profile information.

A stream is specified as a protected stream with an assigned stream identifier and is protected from replacement by hardware detected streams. The stream can be either unlimited or limited based on the stream length. A limited length stream is established, which stops issuing prefetch requests after the number of issued prefetch reaches the number indicated by the code. Step 604 establishes strided streams with specified strides.

In another step, calculations for loop cost and analysis for prefetch distance are made (step 606). Step 606 calculates loop cost for the selected loops and performs static analysis on how fast data are consumed in the loop to determine prefetch distance.

The next step performs global data reuse analysis (step 608). The data reuse is classified into innermost loop reuse, loop nest reuse, and across loop nest program reuse. The L1 cache closest to the main processors is used as a multi-stream prefetch buffer. In step 608, the prefetch window size is selected based on the number of streams in a loop and data reuse information.

Several ways are present to implement an L1 prefetch window may be implemented. In one illustrative embodiment, a set of instruction is used that set the least recently used (LRU) status of an L1 cache line to the state of least-recently-used after the data is accessed, indicating that data should be kept in L1 cache due to high reuse or killed due to no reuse with respect to L1. In another illustrative embodiment, L1-only flush instructions on the processor are used to flush a cache line from the L1 only as opposed to flushing the line from the L1, L2, or L3 caches. Better performance can be achieved by flushing a line from only the L1 if it is known the line will be needed back in the L1 at a later time. Currently, most processor flush instructions will flush a line from the entire cache hierarchy. In a third illustrative embodiment, new prefetch instructions guide the hardware prefetch engine to set L1 least recently used bit indicating either kill or keep/preserve the previous cache line.

A hardware reference threshold is set to automatically invalidate/flush the L1 cache line after a predetermined number of references are provided for the hardware with the ability to automatically purge the L1 cache line without a special instruction of any type. In one illustrative embodiment, the threshold is established by a count value initialized by the processor with a value "n" determined by the compiler, where a cache line is automatically purged after "n" cache line references. In another illustrative embodiment, a number of valid "prefetch buffered" lines is allowed. The threshold may be set by the compiler or selected from predetermined values. The hardware will automatically purge the cache line when the next prefetch is issued.

The process establishes prefetch instruction insertion with prefetch and cache control (step 610). The strided stream size is preferably specified using the data cache block touch (DCBT) instruction, variation, or the functional equivalent. Data cache block touch is an instruction that allows a program to request a cache block fetch before the fetch is actually needed by the program. The compiler automatically inserts data cache block touch variant instructions to create and start sequential and stride streams. Because one set of data cache block touch variants can create and start an entire prefetch stream, these types of variants can be inserted outside the inner loop. Avoiding placement or locating these instructions inside the inner loop helps avoid adverse affects on performance.

FIG. 7 is a flowchart illustrating the operation of a compiler in providing fine grain prefetch in accordance with an illustrative embodiment of the present invention. The process illustrated in FIG. 7 may be implemented in a compiler, such as compiler 502 of FIG. 5.

In the first step, the compiler builds a call graph (step 702). The compiler performs global pointer analysis and escape analysis (step 704). Array data flow is analyzed to get array liveness information (step 706).

The compiler performs traditional data locality optimizations through data reorganization and loop transformation (step 708). Data reorganization may include array splitting, array reordering, array interleaving, and array padding. Loop transformation may include loop fusion, loop unimodular transformation, loop distribution, outer and inner loop unrolling, loop blocking, and temporal vector optimization.

The compiler builds global loop table and loop affinity graph (step 710). The global loop table and loop affinity graph provide working data set analysis. The compiler performs data dependency and extensive data reuse analysis (step 712). The reuse analysis may include spatial and temporal reuse within loops or loop nests and inter-loop reuse. The compiler also performs stream identification and classification (step 714).

The compiler performs reuse distance analysis, work set analysis, memory access frequency analysis, and identify delinquent loads through static and dynamic profile information (step 716). The compiler builds array affinity graph (step 718) and inserts cache and prefetch control instructions (step 720). Step 720 may include inserting prefetch control instructions at an optimal location based on stream types. Based on reuse analysis, a default value, kill, or keep flag is set in the prefetch instructions. Step 720 may also involve inserting new load/store or L1 only data cache flush instructions.

FIG. 8 illustrates an example of code for implementing high level interfaces for cache and prefetch control instructions in accordance with exemplary aspects of the present invention. In code 800, L1 only data cache flush instruction is provided to flush L1 cache line locally as shown in line 802. Alternatively, a new set of load/store instructions could be provided as possible alternatives that explicitly set the least recently used status of an L1 cache line to the state of least recently used after the data is accessed, indicating that data should be kept in L1 due to high reuse or killed due to no reuse with respect to L1. An unlimited length protected stream is also established as shown in line 804. Line 804 of FIG. 8 implements elements of a step such as step 604 shown in FIG. 6.

Notably, exemplary code 800 and specifically section 806 of FIG. 8 may be used to implement various steps established in the process of FIG. 6 for specifying and assigning an identifier to a stream. Prefetching code 808 addresses prefetching streams depending on identification and whether they are protected. The data cache block touch variant instructions of prefetching code 808 provide the stream start address and the start and stop commands for software streams.

Illustrative embodiments of the present invention introduce a new set of cache and prefetch control instructions with several possible alternatives and a compiler method to do program analysis and provide fine-grain local control upper level of memory hierarchy effectively with reuse considerations and cache pollution avoidance. The compiler could issue hints along with the memory operations, specifying whether to move data into a specific level of the cache with a small window or bypass the cache entirely for data that will only be read or written once in a long while or that will only be read or written once in a long while or further push memory operations into the near memory processors if any immediate reuse across loops are present.

FIG. 9 illustrates interaction of memory arrays as information is cycled in accordance with an illustrative embodiment of the present invention. As previously mentioned, the hardware prefetch engine automatically assigns a previously prefetched line which will no longer be used to be least recently used (LRU) 902 in the cache set. L1 cache 904 contains various data structures. A matrix 906 is accessible in a cache friendly manner. T matrix 908 is not accessible in a cache friendly data structure.

FIG. 9 illustrates how prefetching used in conjunction with the automatic LRU feature expands the effective size of L1 cache 904 by cycling a wave front of data in and out of L1 cache 904. Automatic least recently used code cycles T matrix 908 lines out of the L1 cache 904 quickly. If the line will be needed again, the pre-fetcher will bring it back into L1 cache 904 thereby avoiding any performance penalty.

FIG. 10 illustrates exemplary code for no cross-loop reuse in accordance with an illustrative embodiment of the present invention. Code 1000 includes loop one 1002 and loop two 1004. Loop one 1002 performs memory moving from array "b" to array "c". Cache line spatial reuse is present with respect to loop one 1002 for arrays "c" and "b". No immediate cross-loop reuse is present in L1 cache and L2 cache for arrays "c" and "b". Loop two 1004 pushes the rest of the memory moving operation into the memory processor. Instructions for memory moving from array "b" to array "c" may be performed by a memory processor or memory controller such as memory controller 316 in FIG. 3.

FIG. 11 illustrates exemplary code for cross-loop reuse for array "a" in accordance with an illustrative embodiment of the present invention. Code 1100 provides immediate cross-loop reuse for array "a" but not for arrays "b" and "c". Without L1-only data cache flush instruction or new load/store instructions, none of the elements of array "a" will be in L1 cache for the next loop.

FIG. 12 illustrates exemplary code for cross-loop reuse for array "c" in accordance with an illustrative embodiment of the present invention. FIG. 12 shows an exemplary way to avoid L1 cache pollution. Loop 1200 accesses arrays "a" and "b" to do sum reduction. Since no immediate reuse of arrays "a" and "b" after loop 1200 is present, L1-only data cache flush instruction or the new load/store instruction with KILL bit set so that array "c" can be L1 cache resident are inserted.

FIG. 13 illustrates exemplary code for loop strip mining for a large data set in accordance with an illustrative embodiment of the present invention. Code 1300 is useful for very large data set where none of the data can fit into L1. The loop can first be strip mined if it satisfies data dependency requirement. Then we can insert L1-only data cache flush or new load/store instructions for data reuse and cache pollution avoidance.

FIG. 14 illustrates exemplary code for loop blocking in accordance with an illustrative embodiment of the present invention. When nested loops that manipulate arrays that are too large to fit into the cache are needed, the compiler can apply a blocking transformation, which is a combination of strip mining and interchange that maximizes data localization. Under certain circumstances, loop blocking allows reuse of these arrays by transforming the loops that manipulate them so that they manipulate strips of the arrays that fit into the cache. Effectively, a blocked loop accesses array elements in sections that are optimally sized to fit in the cache.

Loops that stride through arrays are candidates for blocking when an outermost loop 1402 carrying spatial or temporal reuse also is present. Blocking innermost loop 1404 allows data referenced by the outermost loop 1402 to remain in the cache across multiple iterations. Blocking exploits spatial reuse by ensuring that once fetched, cache lines are not overwritten until their spatial reuse is exhausted. Temporal reuse is similarly exploited.

Arrays "a", "b", and "c" in FIG. 14 are reused. Spatial reuse of "a" occurs with respect to the "i" loop, spatial reuse of "b" with respect to the "j" loop, spatial reuse of "c" with respect to the "i" loop, and temporal reuse of "c" with respect to the "j" loop. By inserting the new store instruction with KEEP bit set for array "a", some elements of array "a" will still be in L1 cache for reuse after the loop nest.

FIG. 15 is an illustrative graph of reuse distance in accordance with an illustrative embodiment of the present invention. With reuse distance and memory frequency analysis through static and dynamic analysis, the new load/store instructions with KEEP can be inserted for memory accesses with high frequency and small reuse distance, for example, the memory access for array "a" as shown in FIG. 15. The compilers can exploit it effectively through memory reference reordering and grouping.

FIG. 16A illustrates exemplary code for stride accesses for array "t" in accordance with an illustrative embodiment of the present invention. Code 1600 shows an example of a strided memory access of t[it +jj+(jt+k)*t_dim1] in the innermost loop. Because no cross-iteration reuse occurs, there is no need of keeping array "t" in L1 cache after it is stored. The store instruction with L1 LRU bit set as KILL can be used here so that only a small window in L1 for "t" is used.

For the exemplary code in FIG. 16B we can also insert new prefetch control instructions as shown in code 1602 to initiate the hardware prefetch engine to prefetch strided the memory location t[it+jj+(jt+k) *t_dim1] and kill off the previous cache line.

Illustrative embodiments of the present invention allow for more efficient prefetching and cache efficiency. Caching rates are dramatically improved by using the compiler to perform program analysis and using new and simple cache and prefetch control instructions. The compiler uses for loop analysis, the arrays, add values of the arrays, the pattern index to perform strided stream prefetching for strides of 1 and strides of "n". The set of control instructions may include instructions to establish prefetch start address, stop address, stride length, number of references, reference pattern, or providing a hint for automatic identification of address for prefetch By quickly ridding the L1 cache of the most recently used lines instead of protecting them, the processor is able to prefetch more lines in to the L1 creating a virtual L1 buffer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a cache memory system, the computer implemented method comprising:
    analyzing a loop construct to identify data usage characteristics for cache and prefetching conditions for each of a plurality of streams associated with the loop construct;
    inserting instructions into the loop construct to form a modified loop construct, the instructions configured to control a cache management policy for allocating to each of the plurality of streams a set of cache lines in the cache memory system; and
    controlling, by a controller operably connected to the cache memory system, the cache memory system to de-allocate cache lines from a stream in the plurality of streams after a cache reference pattern based on the cache management policy.

2. The computer implemented method of claim 1, wherein each of the plurality of streams are allocated to the set of cache lines based on the data usage characteristics for cache and prefetching conditions that are particular to each of the plurality of streams.

3. The computer implemented method of claim 1, wherein the instructions inserted into the loop construct are for at least one of configuring a hardware prefetch engine, direct execution by the hardware prefetch engine, and cache control hardware.

4. The computer implemented method of claim 3, wherein the instructions inserted into the loop construct are selected from at least one of a specific cache-level line flush, invalidate, write-through, write-bypass, and usage state.

5. The computer implemented method of claim 1, wherein the instructions inserted into the loop construct are selected from at least one of a establish prefetch start address, stop address, stride length, number of references, reference pattern, or providing a hint for automatic identification of address for prefetch.

6. The computer implemented method of claim 5, wherein the reference pattern comprises monitoring read references and write references for establishing a threshold for determining when the cache management policy is invoked.

7. The computer implemented method of claim 1, wherein the analyzing step comprises:
    building a call graph;
    performing global pointer and escape analysis;
    analyzing array data flow;
    reorganizing data for data locality;
    performing loop optimization for data locality;
    building global loop table and loop affinity graph;
    analyzing data dependency and data reuse;
    performing stream identification and stream classification;
    analyzing reuse distance and data work set;
    building array affinity y graph;
    determining an set of active cache lines in a cache to be allocated to each stream identified based on a size of the cache and the stream classification of each stream identified; and
    executing cache and prefetch control instruction insertion.

8. The computer implemented method of claim 4, wherein the instructions inserted into the loop construct are for guiding a hardware prefetch engine to alter the cache management policy and further comprise:
    identifying and classifying a stream;
    selecting a loop and stream;
    calculating loop cost and analyzing prefetch distance;
    analyzing global reuse and a L1 window size threshold for the stream; and
    inserting prefetch instructions for prefetch and cache control, wherein the prefetch instructions limit the L1 window size threshold for the stream to the set of cache lines.

9. The computer implemented method of claim 1, further comprising:
    flushing a cache line at a specific level;
    instructing the hardware prefetch engine to mark the cache line for replacement or preservation;
    responsive to meeting a threshold corresponding to the set of cache lines in the cache memory system to the at least one stream, flushing the cache line; and
    responsive to detecting a strided stream, implementing strided stream prefetching in the hardware prefetch engine.

10. The computer implemented method of claim 9, wherein the threshold comprises at least one of a count value initialized by the processor with a value determined by the compiler, wherein the cache line is automatically replaced after the value of cache line references is met, a value set by the compiler, and a predetermined value.

11. A computer implemented method for managing a cache, the computer implemented method comprising:
    responsive to encountering a control instruction during execution of a loop construct, implementing a cache management policy for allocating to each of a plurality of streams associated with the loop construct a set of cache lines in the cache, wherein each of the plurality of streams are allocated to the set of cache lines based on data usage characteristics for cache and prefetching conditions that are particular to each of the plurality of streams;

responsive to exceeding the set of cache lines in the cache allocated for the at least one stream, instructing a hardware prefetch engine to mark a cache line associated with the at least one stream for replacement or preservation based on the cache management policy; and responsive to meeting a threshold of the cache, flushing the cache line from the cache.

12. The computer implemented method of claim 11, wherein the implementing step comprises indicating that data should be kept in the cache or replaced.

13. The computer implemented method of claim 11 further comprising:

responsive to detecting a strided stream, implementing, by a compiler, strided stream prefetching in the hardware prefetch engine through analyzing loop constructs during compilation of source code to identify data usage characteristics for cache management and prefetch management, wherein identifying data usage characteristics for cache management and prefetch management comprises:

detecting the strided stream in hardware from hints from the compiled code, wherein hints are provided to establish the stride pattern and a hardware prefetch engine monitors a reference address pattern.

14. The computer implemented method of claim 11, wherein the threshold comprises any of a count value initialized by the processor with a value determined by the compiler, wherein the cache line is automatically purged after the value of cache line references is met, a value set by the compiler, and a predetermined value.

15. The computer implemented method of claim 13, wherein implementing strided stream prefetching in the hardware prefetch engine further comprises:

establishing an unlimited length stream;
establishing a limited length stream;
establishing a strided stream with specified stride using variants of a data cache block touch;
specifying a threshold count of a reference pattern of a cache line associated with a specified stream; and
specifying stream weighting for the cache management policy.

16. A system comprising:

a set of processors, wherein a processor of the set of processors is configured to execute computer usable program code to analyze a loop construct to identify data usage characteristics for cache and prefetching conditions for each of a plurality of streams associated with the loop construct;

a plurality of caches operably connected to at least one processor of the set of processors for accessing data stored in memory, wherein the plurality of caches includes a L1 cache closest to at least one processor of the set of processors, wherein the L1 cache is configured as a multi-stream prefetch buffer and, wherein the processor is further configured to execute the computer usable program code to insert instructions into the loop construct to form a modified loop construct, the instructions configured to control a cache management policy for allocating to each of the plurality of streams a set of cache lines in the plurality of caches, wherein each of the plurality of streams are allocated to the set of cache lines based on the data usage characteristics for cache and prefetching conditions that are particular to each of the plurality of streams;

a controller operably connected to the plurality of caches, wherein the controller is configured to de-allocate cache lines from a stream in the plurality of streams after a cache reference pattern based on the cache management policy;

a hardware prefetch engine operably connected to the plurality of caches; and a main memory operably connected to the plurality of caches.

17. The system of claim 16, further comprising:

a special memory processor operably connected to the plurality of caches for organizing data with respect to levels of a memory hierarchy.

18. A computer program product comprising a non-transitory computer readable storage medium including computer usable program code for managing a cache memory system, said computer program product including:

computer usable program code for analyzing a loop construct to identify data usage characteristics for-cache and prefetching conditions for each of a plurality of streams associated with the loop construct;

computer usable program code for inserting instructions into the loop construct to form a modified loop construct, the instructions configured to control a cache management policy for allocating to each of the plurality of streams a set of cache lines in the cache memory system, wherein each of the plurality of streams are allocated to the set of cache lines based on the data usage characteristics for cache and prefetching conditions that are particular to each of the plurality of streams; and computer usable program code for controlling the cache memory system to de-allocate cache lines from a stream in the plurality of streams after a cache reference pattern based on the cache management policy.

19. The computer program product of claim 18, wherein the instructions inserted into the streams are for guiding a hardware prefetch engine to alter the cache management policy and further comprise:

computer usable program code for identifying and classifying a stream;
computer usable program code for selecting a loop and stream;
computer usable program code for calculating loop cost and analyzing prefetch distance;
computer usable program code for analyzing global reuse and a L1 window size threshold for the stream; and
computer usable program code for inserting prefetch instructions for prefetch and cache control, wherein the prefetch instructions limit the L1 window size threshold for the stream to the set of cache lines.

20. The computer program product of claim 18, wherein computer usable program code for analyzing comprises:

computer usable program code for building a call graph;
computer usable program code for performing global pointer and escape analysis;
computer usable program code for analyzing array data flow;
computer usable program code for reorganizing data for data locality;
computer usable program code for performing loop optimization for data locality;
computer usable program code for building global loop table and loop affinity graph;
computer usable program code for analyzing data dependency and data reuse;
computer usable program code for performing stream identification and stream classification;

computer usable program code for analyzing reuse distance and data work set;
computer usable program code for building array affinity graph
computer usable program code for determining an set of active cache lines in a cache to be allocated to each stream identified based on a size of the cache and the stream classification of each stream identified; and
computer usable program code for executing cache and prefetch control instruction insertion.

* * * * *